United States Patent
Kimura et al.

(10) Patent No.: US 10,147,250 B2
(45) Date of Patent: Dec. 4, 2018

(54) DOOR UNLOCKING SYSTEM AND DOOR UNLOCKING METHOD

(71) Applicant: Murata Manufacturing Co., Ltd., Nagaokakyo-shi, Kyoto-fu (JP)

(72) Inventors: Ikuhei Kimura, Nagaokakyo (JP); Makoto Yasutake, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/260,431

(22) Filed: Sep. 9, 2016

(65) Prior Publication Data

US 2016/0379427 A1    Dec. 29, 2016

Related U.S. Application Data

(63) Continuation of application No. PCT/JP2015/056136, filed on Mar. 3, 2015.

(30) Foreign Application Priority Data

Mar. 11, 2014    (JP) ................. 2014-047098

(51) Int. Cl.
*G08C 17/02* (2006.01)
*G06F 21/35* (2013.01)
(Continued)

(52) U.S. Cl.
CPC ........ *G07C 9/00111* (2013.01); *B60R 25/245* (2013.01); *G06F 21/35* (2013.01);
(Continued)

(58) Field of Classification Search
None
See application file for complete search history.

(56) References Cited

U.S. PATENT DOCUMENTS 5,937,065 A * 8/1999 Simon .................... B60R 25/24
380/262
6,538,560 B1 * 3/2003 Stobbe ................... B29C 44/56
340/5.72

(Continued)

FOREIGN PATENT DOCUMENTS

JP    2001-115698 A    4/2001
JP    2001-254549 A    9/2001
(Continued)

OTHER PUBLICATIONS

English translation of Official Communication issued in corresponding International Application PCT/JP2015/056136, dated May 26, 2015.

(Continued)

*Primary Examiner* — Steven Lim
*Assistant Examiner* — Muhammad Adnan
(74) *Attorney, Agent, or Firm* — Keating & Bennett, LLP (57) ABSTRACT

An electronic key executes keyless entry communication or RFID communication. A wireless controller mounted on a vehicle executes keyless entry communication within a range of a radius of several meters to several tens of meters. An RFID reader is assigned to each door and executes RFID communication within a range of a radius of approximately 1 meter. In regards to unlocking the door, the wireless controller issues a password by the keyless entry communication, and a wireless circuit temporarily stores the issued password. The RFID readers search for the password stored in the electronic key by the RFID communication, and the wireless controller unlocks a door corresponding to the RFID reader for which the password was detected.

20 Claims, 9 Drawing Sheets

(51) Int. Cl.
*B60R 25/24* (2013.01)
*G07C 9/00* (2006.01)
*H04L 29/06* (2006.01)

(52) U.S. Cl.
CPC ......... *G07C 9/00309* (2013.01); *G08C 17/02* (2013.01); *H04L 63/0492* (2013.01); *G07C 2009/00793* (2013.01); *G07C 2209/64* (2013.01); *G08C 2201/61* (2013.01)

(56) References Cited

U.S. PATENT DOCUMENTS

| | | | | |
|---|---|---|---|---|
| 8,947,202 | B2* | 2/2015 | Tucker | G07C 9/00309 340/5.61 |
| 2004/0174248 | A1* | 9/2004 | Lefaure | B60R 25/245 340/5.72 |
| 2010/0052845 | A1* | 3/2010 | Yamamoto | B60R 25/24 340/5.8 |
| 2010/0210319 | A1* | 8/2010 | Tanaka | B60R 25/24 455/572 |
| 2010/0265032 | A1* | 10/2010 | Nonaka | B60R 25/045 340/5.61 |
| 2015/0070135 | A1* | 3/2015 | Ford | B60R 25/24 340/5.72 |
| 2016/0225203 | A1* | 8/2016 | Asmar | G07C 9/00309 |

FOREIGN PATENT DOCUMENTS

| | | | |
|---|---|---|---|
| JP | 2007297774 A | * | 11/2007 |
| JP | 2009-2034 A | | 1/2009 |
| JP | 2009-64180 A | | 3/2009 |
| JP | 2009-79418 A | | 4/2009 |
| JP | 2012-132222 A | | 7/2012 |
| JP | 2012-172334 A | | 9/2012 |

OTHER PUBLICATIONS

Official Communication issued in corresponding Japanese Patent Application No. 2016-507462, dated Sep. 27, 2016.

* cited by examiner

DOOR UNLOCKING SYSTEM AND DOOR UNLOCKING METHOD

CROSS REFERENCE TO RELATED APPLICATIONS

This application claims the benefit of priority to Japanese Patent Application 2014-047098 filed on Mar. 11, 2014 and is a Continuation Application of PCT/JP2015/056136 filed on Mar. 3, 2015, the entire contents of each application are hereby incorporated herein by reference.

BACKGROUND OF THE INVENTION

1. Field of the Invention

The present invention relates to a door unlocking system and a door unlocking method and, more particularly, relates to a door unlocking system and a door unlocking method to exclusively unlock some of a plurality of doors of a vehicle.

2. Description of the Related Art

A keyless entry system is known that unlocks doors of a vehicle by utilizing a wireless signal between a key carried by a user and a wireless device mounted on the vehicle. In this system, normally, when the user pushes an unlock button of the portable key, all the doors of the vehicle are unlocked. However, simultaneously unlocking all the doors leads to a security problem because, for example, when the user gets in the driver's seat, a suspicious person may enter the interior of the vehicle from the passenger's side of the vehicle.

In this regard, JP 2009-79418 A discloses a system changing the number of doors to be unlocked, based on positional information of a vehicle. This system enables provision of control such as unlocking only the door on the side of the driver's seat when it is determined that a vehicle is located in a relatively unsafe area, based on GPS information.

However, the system of JP 2009-79418 A uses GPS information and therefore has a complicated circuit configuration. Additionally, it is difficult to provide a boundary of safety around an area in which a vehicle is located and a risk of a suspicious person getting into a vehicle is not necessarily eliminated even in a safe area, resulting in a limited user's convenience.

SUMMARY OF THE INVENTION

Preferred embodiments of the present invention provide a door unlocking system and a door unlocking method enabling simplification of a circuit configuration and enhancement of a user's convenience.

A door unlocking system according to a preferred embodiment of the present invention includes a portable device carried by a user and performing a wireless communication following a first short-range wireless communication mode and a wireless communication following a second short-range wireless communication mode; a first in-vehicle device mounted on a vehicle including a plurality of doors, the first in-vehicle device performing the wireless communication following the first short-range wireless communication mode in a first range; and a plurality of second in-vehicle devices mounted on the vehicle respectively correspondingly to the plurality of doors and each performing the wireless communication following the second short-range wireless communication mode in a second range smaller than the first range, the first in-vehicle device including a password generator issuing a password to the portable device in the first short-range wireless communication mode, the portable device including a storage temporarily storing a password issued by the password generator, the plurality of second in-vehicle devices each including a password detector searching for a password stored in the storage in the second short-range wireless communication mode, the first in-vehicle device further including an unlocking actuator unlocking a door corresponding to the second in-vehicle device including the password detector detecting the password stored in the storage.

Preferably, the password issued by the password generator has contents updated each time the number of times of issuance reaches a reference value.

Preferably, the portable device further includes an indicator notifying the first in-vehicle device of an unlocking operation by the user, and the password generator issues the password in response to a notification from the indicator.

Preferably, the portable device includes a passive wireless communication tag in accordance with the second short-range wireless communication mode.

Preferably, the plurality of second in-vehicle devices covers respective ranges independent of each other as the second range.

A door unlocking method according to another preferred embodiment of the present invention is a door unlocking method performed by a door unlocking system including a portable device carried by a user and performing a wireless communication following a first short-range wireless communication mode and a wireless communication following a second short-range wireless communication mode, a first in-vehicle device mounted on a vehicle including a plurality of doors, the first in-vehicle device performing the wireless communication following the first short-range wireless communication mode in a first range, and a plurality of second in-vehicle devices mounted on the vehicle respectively correspondingly to the plurality of doors and each performing the wireless communication following the second short-range wireless communication mode in a second range smaller than the first range, the method including an issuing step in which the first in-vehicle device issues a password to the portable device in the first short-range wireless communication mode; a storing step in which the portable device temporarily stores a password issued in the issuing step; a searching step in which each of the plurality of second in-vehicle devices searches for a password stored in the storing step in the second short-range wireless communication mode; and an unlocking step in which the first in-vehicle device unlocks a door corresponding to the second in-vehicle device detecting the password stored in the storing step.

The first in-vehicle device issues a password in the first short-range wireless communication mode when a user carrying the portable device approaches the vehicle or when the user manually performs the unlocking operation of the portable device. The issued password is stored in the portable device. The second in-vehicle device corresponding to the door approached by the user detects the password stored in the portable device in the second short-range wireless communication mode. The first in-vehicle device exclusively unlocks the door corresponding to the second in-vehicle device detecting the password, i.e., the door approached by the user. Since a series of the processes described above is implemented in the short-range wireless communication modes, the circuit configuration is simplified. Since the door approached by the user is exclusively unlocked, the risk of a suspicious person getting into the vehicle from another door is prevented and the user's convenience is enhanced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
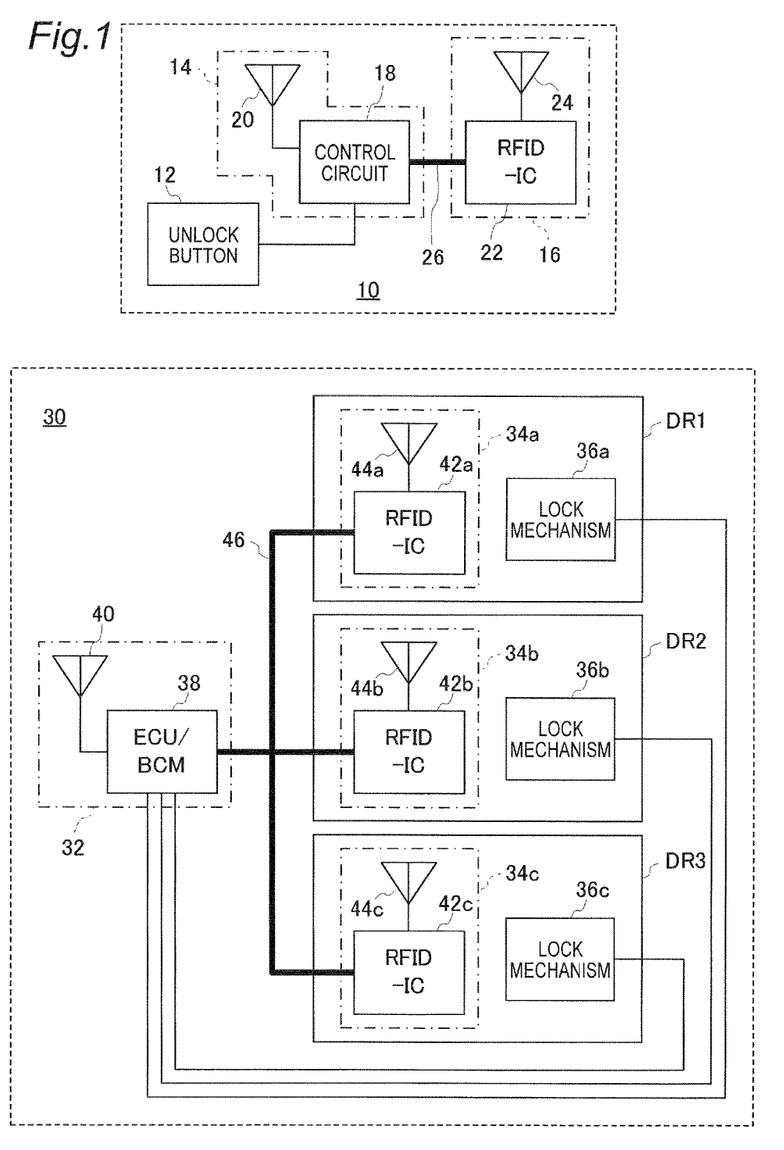
FIG. 1 is a block diagram of an example of a configuration of a door unlocking system according to the example.
Figure 2:
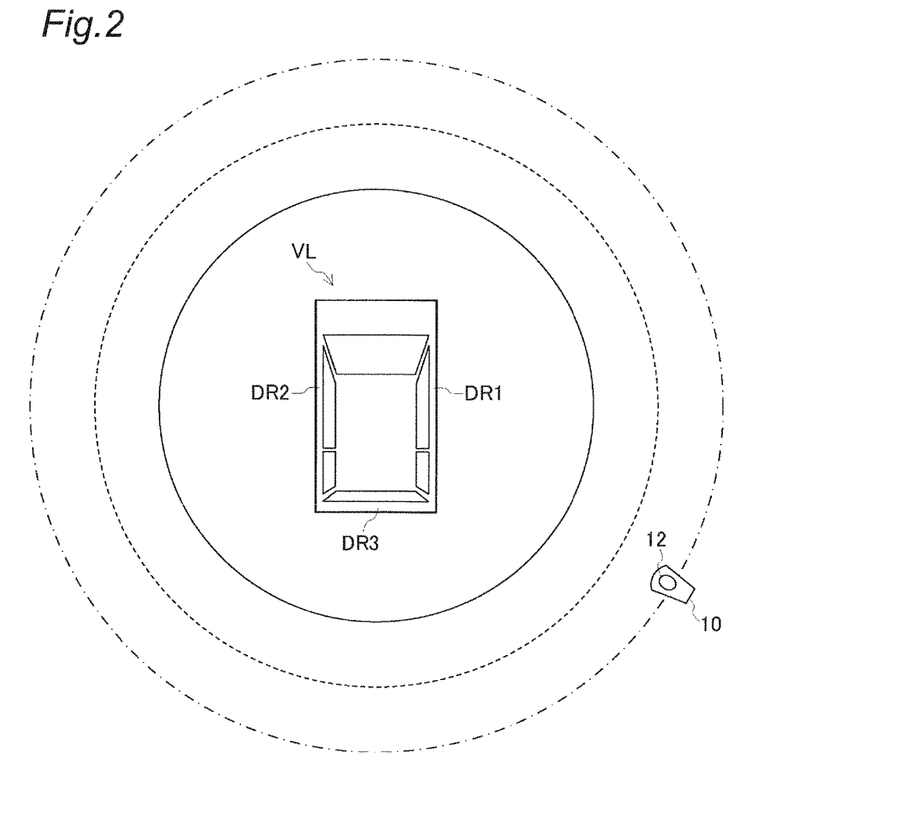
FIG. 2 is a schematic of an example of a positional relation between a communication range of a keyless entry communication mode and an electronic key.
Figure 3:
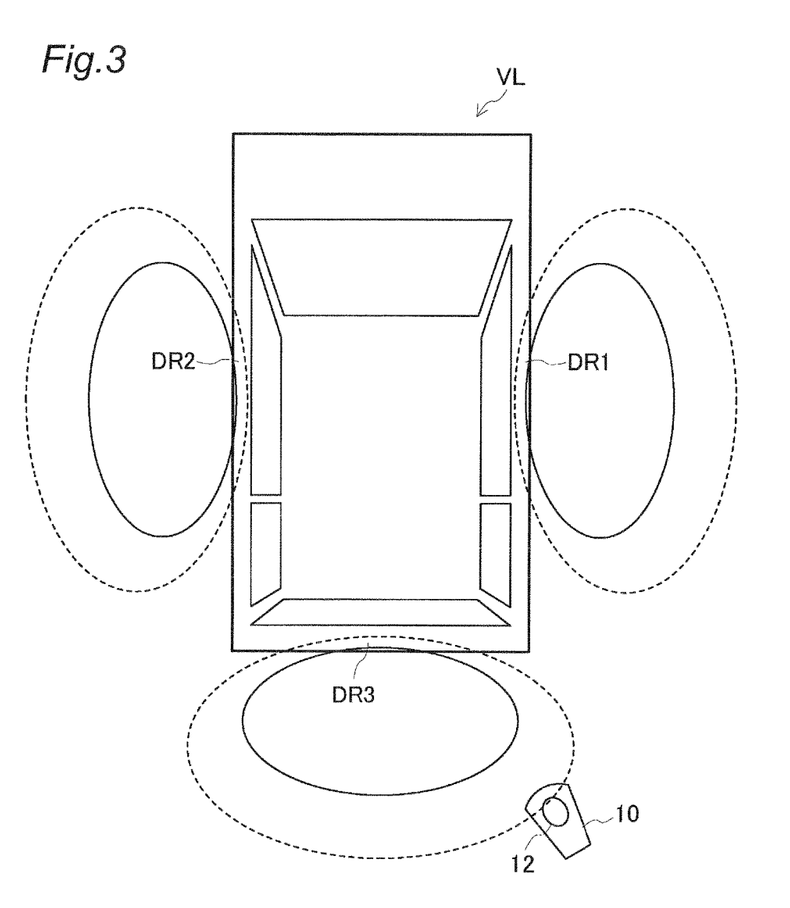
FIG. 3 is a schematic of an example of a positional relation between a communication range of an RFID communication mode and the electronic key.

Referring to FIGS. 1 to 3, a door unlocking system according to a preferred embodiment of the present invention includes an electronic key (portable device) 10 carried by a user, and a vehicle control apparatus 30 mounted on a vehicle (automobile) VL including doors DR1 to DR3. The door DR1 is disposed on a right side portion of the vehicle VL, the door DR2 is disposed on a left side portion of the vehicle VL, and the door DR3 is disposed on a rear portion of the vehicle VL.

The electronic key 10 includes an unlock button 12 operated by a user, a wireless circuit 14 performing a wireless communication in a keyless entry (a wireless entry system for a vehicle using a remote key (an electronic key); also referred to as smart entry, keyless access, or a number of other names) communication mode (first short-range wireless communication mode), and an RFID tag 16 performing a wireless communication in an RFID communication mode (second short-range wireless communication mode). The wireless circuit 14 includes a control circuit 18 and an antenna 20. The RFID tag 16 is a passive RFID tag and includes an RFID-IC 22 and an antenna 24. The unlock button 12 is connected to the control circuit 18. The control circuit 18 is connected through the I²C (Inter-Integrated Circuit) interface 26 to the RFID-IC 22.

The vehicle control apparatus 30 includes a wireless controller (first in-vehicle device) 32 performing a wireless communication in the keyless entry communication mode, RFID readers (second in-vehicle devices) 34a to 34c each performing a wireless communication in the RFID communication mode, and lock mechanisms 36a to 36c locking/unlocking the doors DR1 to DR3, respectively. The RFID reader 34a is disposed in the vicinity of the door DR1, the RFID reader 34b is disposed in the vicinity of the door DR2, and the RFID reader 34c is disposed in the vicinity of the door DR3.

The wireless controller 32 includes an ECU/BCM (Electronic Controller/Body Control Module) 38 and an antenna 40. The RFID reader 34a includes an RFID-IC 42a and an antenna 44a, the RFID reader 34b includes an RFID-IC 42b and antenna 44b, and the RFID reader 34c includes an RFID-IC 42c and an antenna 44c. The ECU/BCM 38 is connected through the I2C interface 46 to the RFID-ICs 42a to 42c.

In the keyless entry communication mode, a range of several meters to several dozen meters in radius is set as a communication range, and communications are performed by using high-frequency signals preferably in the LF band (125 KHz band) and the UHF band (315 MHz band in Japan and US, 433 MHz band in Europe), for example. On the other hand, in the RFID communication mode, a range of approximately 1 m in radius is preferably set as a communication range, and communications are performed by using high-frequency signals preferably in the UHF band (900 MHz band), for example.

Because of differences in frequency and directivity of antennas, the communication range of the keyless entry communication mode radially spreads from the center of the vehicle VL, while the communication range of the RFID communication mode spreads from each of the doors DR1 to DR3 as a base point to the outside of the vehicle VL since the RFID tag is a passive RFID tag. The communication range of the RFID communication mode is smaller than the communication range of the keyless entry communication mode (see FIGS. 2 and 3). The three communication ranges respectively covered by the RFID readers 34a to 34c are independent or substantially independent of each other (not overlapped or substantially not overlapped with each other or different from each other in the directionality of the antennas of the RFID readers), and the communication range covered by the wireless controller 32 covers all the three communication ranges respectively covered by the RFID readers 34a to 34c.

The electronic key 10 includes a small-sized primary battery (not shown) built-in, and the vehicle VL is equipped with a large-sized secondary battery (not shown). In the electronic key 10, the power of the primary battery is supplied only to the wireless circuit 14. In contrast, in the vehicle control apparatus 30, the power of the secondary battery is supplied to all of the wireless controller 32, the RFID readers 34a to 34c, and the lock mechanisms 36a to 36c.

A user is able to exclusively unlock the door approached by the user out of the doors DR1 to DR3 disposed on the vehicle VL, by using the electronic key 10. In this case, the keyless entry communication or the RFID communication is executed between the electronic key 10 and the vehicle control apparatus 30 in the order shown in FIG. 4.

Figure 4:
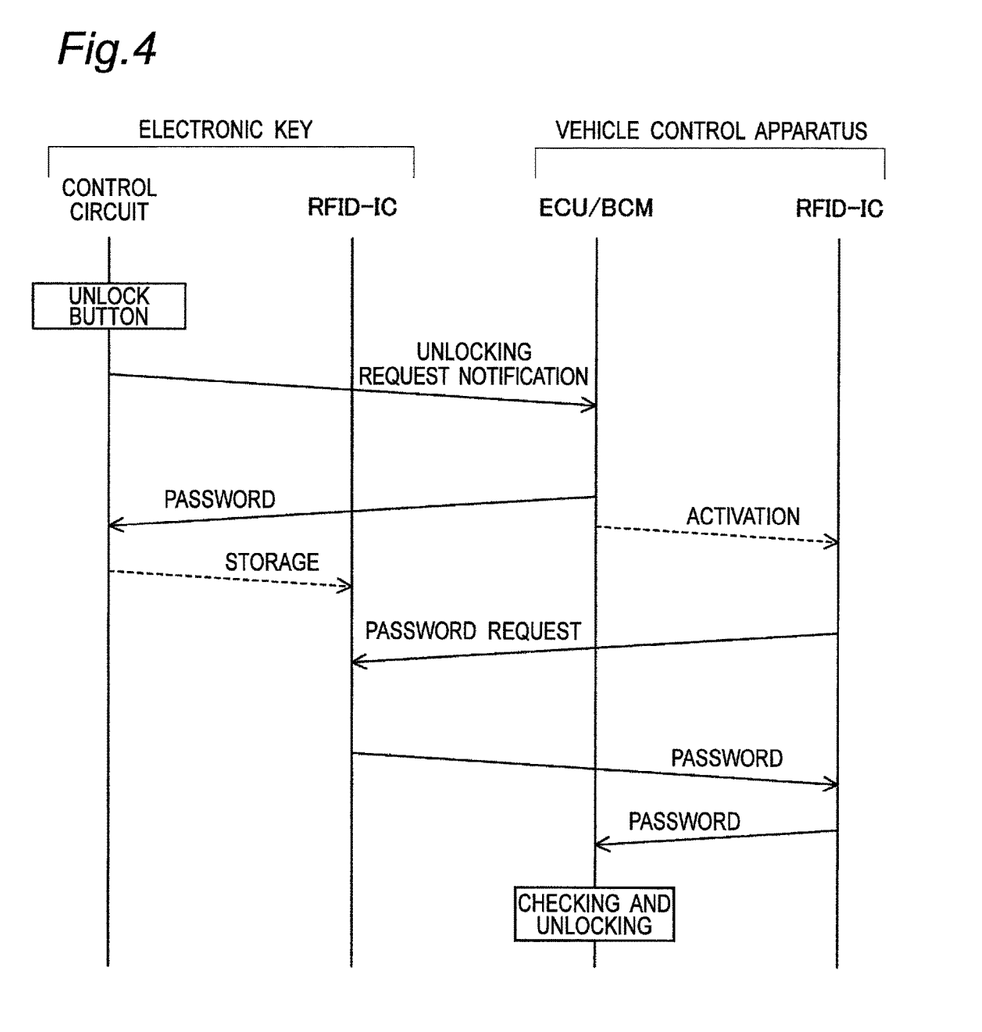
FIG. 4 is a schematic of an example of a communication operation between the electronic key and a vehicle control apparatus.

First, when the unlock button 12 disposed on the electronic key 10 is operated, the control circuit 18 notifies the ECU/BCM 38 of an unlocking request. This notification includes a description of a unique key code. This notification is transmitted in the keyless entry communication mode to the ECU/BCM 38.

If the key code included in the received unlocking request notification is successfully authenticated, the ECU/BCM 38 generates a password (random number or cryptography key) and returns the generated password to the control circuit 18 of the electronic key 10 that is the source of notification of the unlocking request. The password is a one-time password (One Time Password) having contents updated each time and is returned in the keyless entry communication mode to the control circuit 18. Once the return is completed, the ECU/BCM 38 activates the RFID-ICs 42a to 42c disposed on the RFID readers 34a to 34c and starts searching for the RFID tag 16.

When receiving the password from the ECU/BCM 38, the control circuit 18 of the electronic key 10 temporarily stores this password in a memory (not shown) in the RFID-IC 22. The RFID readers 34a to 34c activated by the ECU/BCM 38 start searching for the RFID tag 16 of the electronic key 10. When any of the RFID readers detects the RFID tag 16, i.e., when the RFID tag 16 comes into the communication range of any of the RFID readers, the unique ID of the RFID tag 16 is utilized to start an authentication work thereof. If this authentication is successful, the RFID-IC with the successful RFID authentication issues a password request to the RFID tag 16. This password request is repeatedly transmitted in the RFID communication mode.

When the password request is received, the RFID-IC 22 disposed in the RFID tag 16 returns the password stored in the memory in the RFID communication mode to the request source (any one of the RFID-ICs 42a to 42c). When receiving the password from the electronic key 10, the request source RFID-IC internally transfers this password via the I2C interface 46 to the ECU/BCM 38.

The ECU/BCM 38 checks the transferred password against the password issued in the manner described above. If the result of the checking indicates "matching," the ECU/BCM 38 exclusively unlocks the lock mechanism corresponding to the RFID-IC that has transferred the password, out of the lock mechanisms 36a to 36c. For example, if the transfer source of the password is the RFID-IC 42c, the lock mechanism 36c, i.e., the door DR3, is unlocked. The RFID readers 34a to 34c are stopped after the unlocking is completed.

Figure 5:
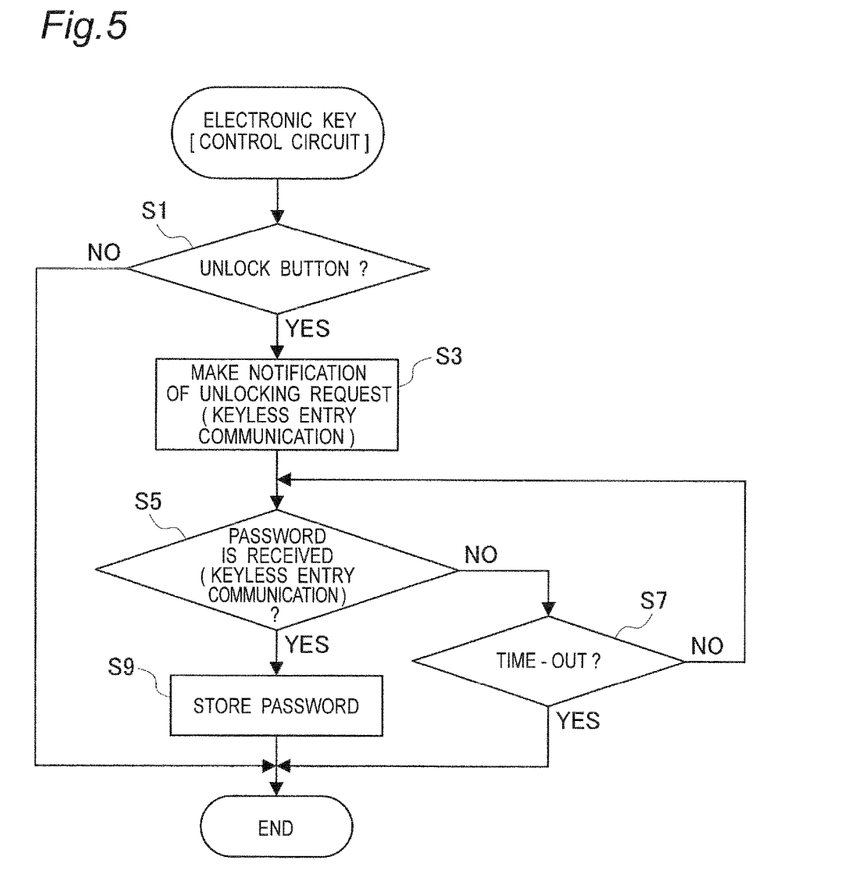
FIG. 5 is a flowchart of an example of an operation of a control circuit disposed in the electronic key.

The control circuit 18 disposed in the electronic key 10 executes a process according to a flowchart shown in FIG. 5 in association with unlocking of the doors DR1 to DR3. This process is repeatedly executed every several milliseconds, for example.

First, it is determined at step S1 whether the unlock button 12 is operated. If the determination result is NO, the process is terminated, or if the determination result is YES, the process goes to step S3. At step S3, the wireless controller 32 disposed on the vehicle VL is notified of an unlocking request. This notification includes a description of a unique key code. This notification is transmitted in the keyless entry communication mode to the wireless controller 32.

When the notification is completed, it is determined at step S5 whether a password is received from the wireless controller 32 in the keyless entry communication mode, and it is determined at step S7 whether a time-out has occurred (a predetermined time has elapsed after the notification of the unlocking request). If the determination result of step S5 is YES, the process goes to step S9 and the received password is stored in the memory (not shown) in the RFID-IC 22. When the storage is completed, the process is terminated. If the determination result of step S7 is YES, the process is terminated without going through step S9.

Figure 6:
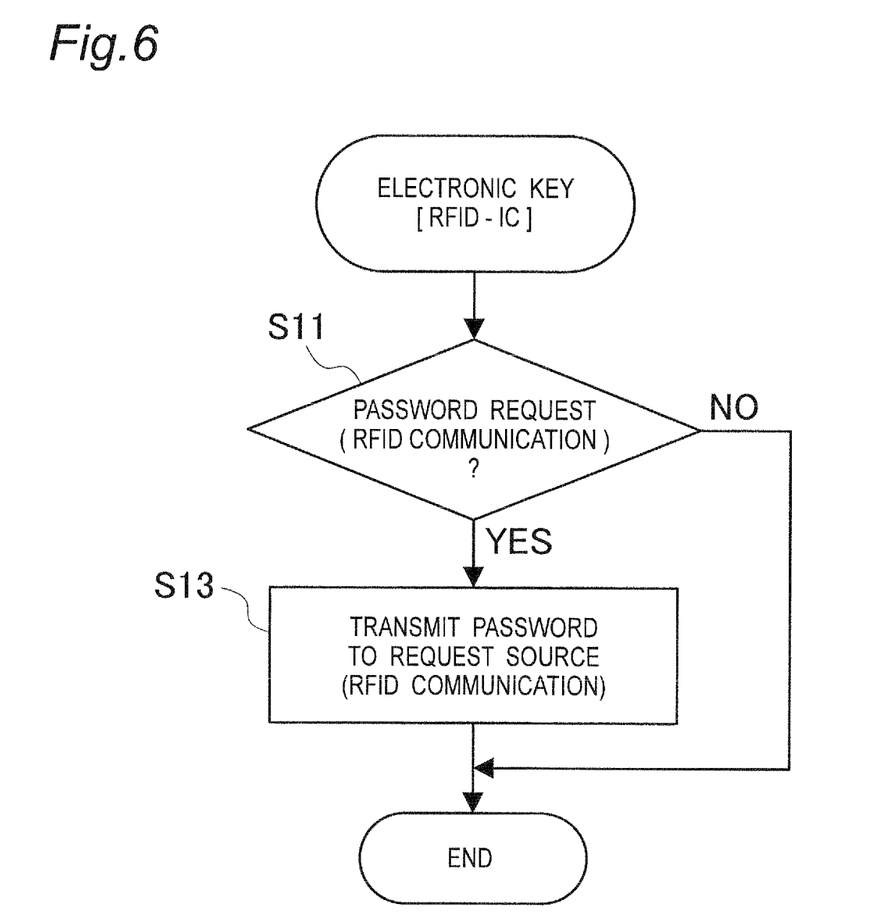
FIG. 6 is a flowchart of an example of an operation of an RFID-IC disposed in the electronic key.

The RFID-IC 22 disposed in the electronic key 10 executes a process according to a flowchart shown in FIG. 6 in association with unlocking of the doors DR1 to DR3. This process is repeatedly executed every several milliseconds in an activated state based on an externally received wireless signal.

First, it is determined at step S11 whether a password request is received. If the determination result is YES, the process goes to step S13, and the password stored in the memory by the process of step S9 described above is returned in the RFID communication mode to the request source. When the return is completed, the process is terminated. If the determination result of step S11 is NO, the process is terminated without going through step S13.

Figure 7:
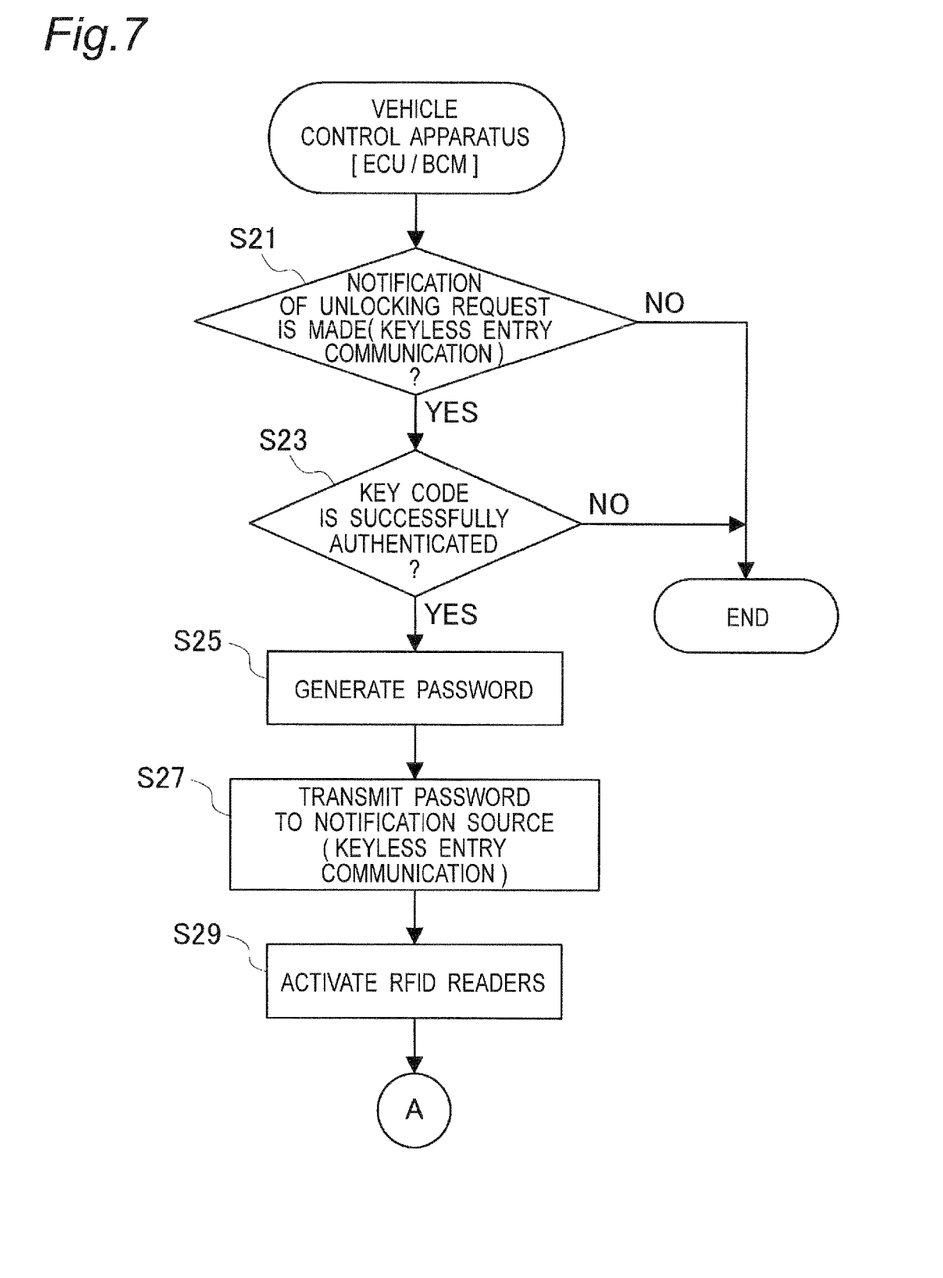
FIG. 7 is a flowchart of a portion of an operation of an ECU/BCM disposed in the vehicle control apparatus.
Figure 8:
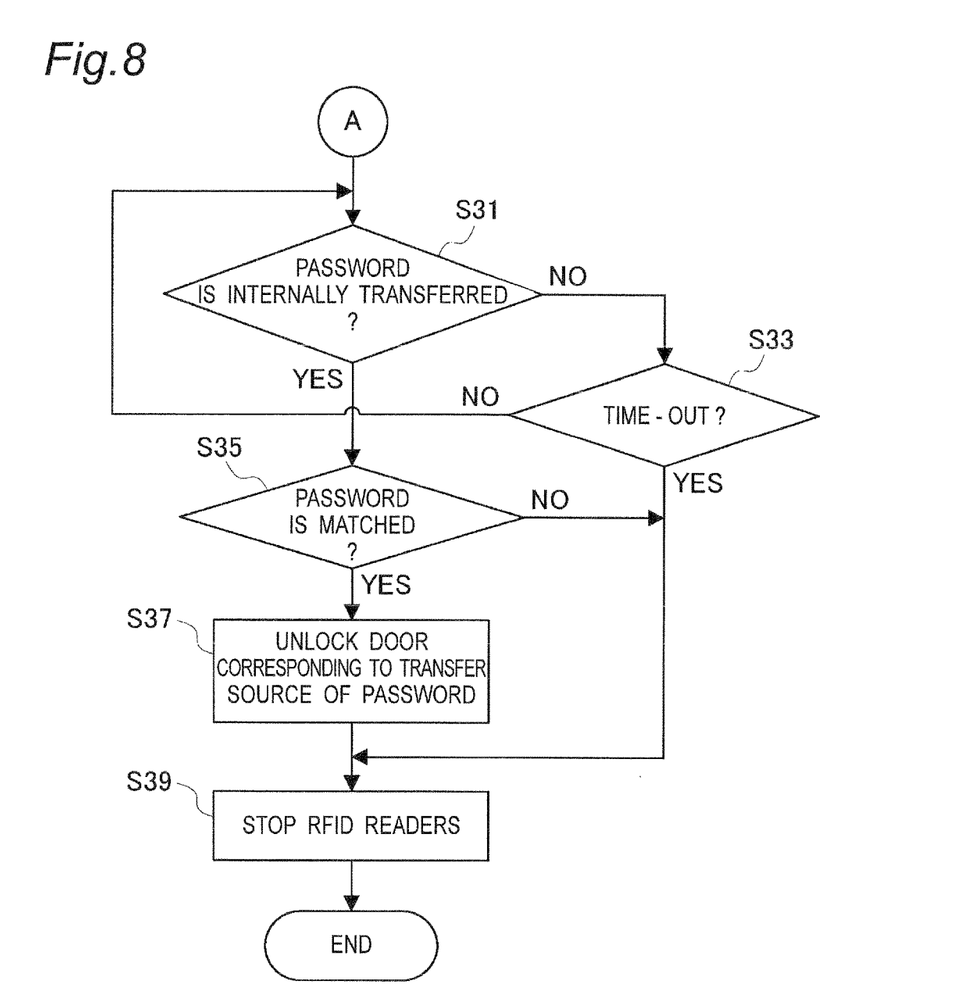
FIG. 8 is a flowchart of another portion of the operation of the ECU/BCM disposed in the vehicle control apparatus.

The ECU/BCM 38 disposed in the vehicle control apparatus 30 executes a process according to flowcharts shown in FIGS. 7 and 8 in association with unlocking of the doors DR1 to DR3. This process is also repeatedly executed every several milliseconds, for example.

It is determined at step S21 whether a notification of an unlocking request is made in the keyless entry communication mode, and it is determined at step S23 whether a key code described in the notification is successfully authenticated. If either the determination result of step S21 or the determination result of step S23 is NO, the process is terminated. In contrast, if both the determination result of step S21 and the determination result of step S23 are YES, the process goes to step S25.

A password is generated at step S25, and the generated password is issued to the notification source of the unlocking request at step S27. The password is transmitted in the keyless entry communication mode to the notification source. When the transmission is completed, the process goes to step S29 and the RFID readers 34a to 34c are activated.

It is determined at step S31 whether the password is transmitted via the I2C interface 46 from any one of the RFID-ICs 42a to 42c, and it is determined at step S33 whether a time-out has occurred (a predetermined time has elapsed after the process of step S29). If the determination result of step S31 is YES, the process goes to step S35, and it is determined whether the transferred password matches the password issued at step S25.

If the determination result of step S35 is YES, the process goes to step S37 to unlock the lock mechanism corresponding to the transfer source of the password out of the lock mechanisms 36a to 36c. After the unlocking is completed, the RFID readers 34a to 34c are stopped at step S39, and the process is subsequently terminated. If the determination result at step S33 is YES or the determination result of step S35 is NO, the RFID readers 34a to 34c are stopped at step S39 without executing the process of step S37, and the process is subsequently terminated.

Figure 9:
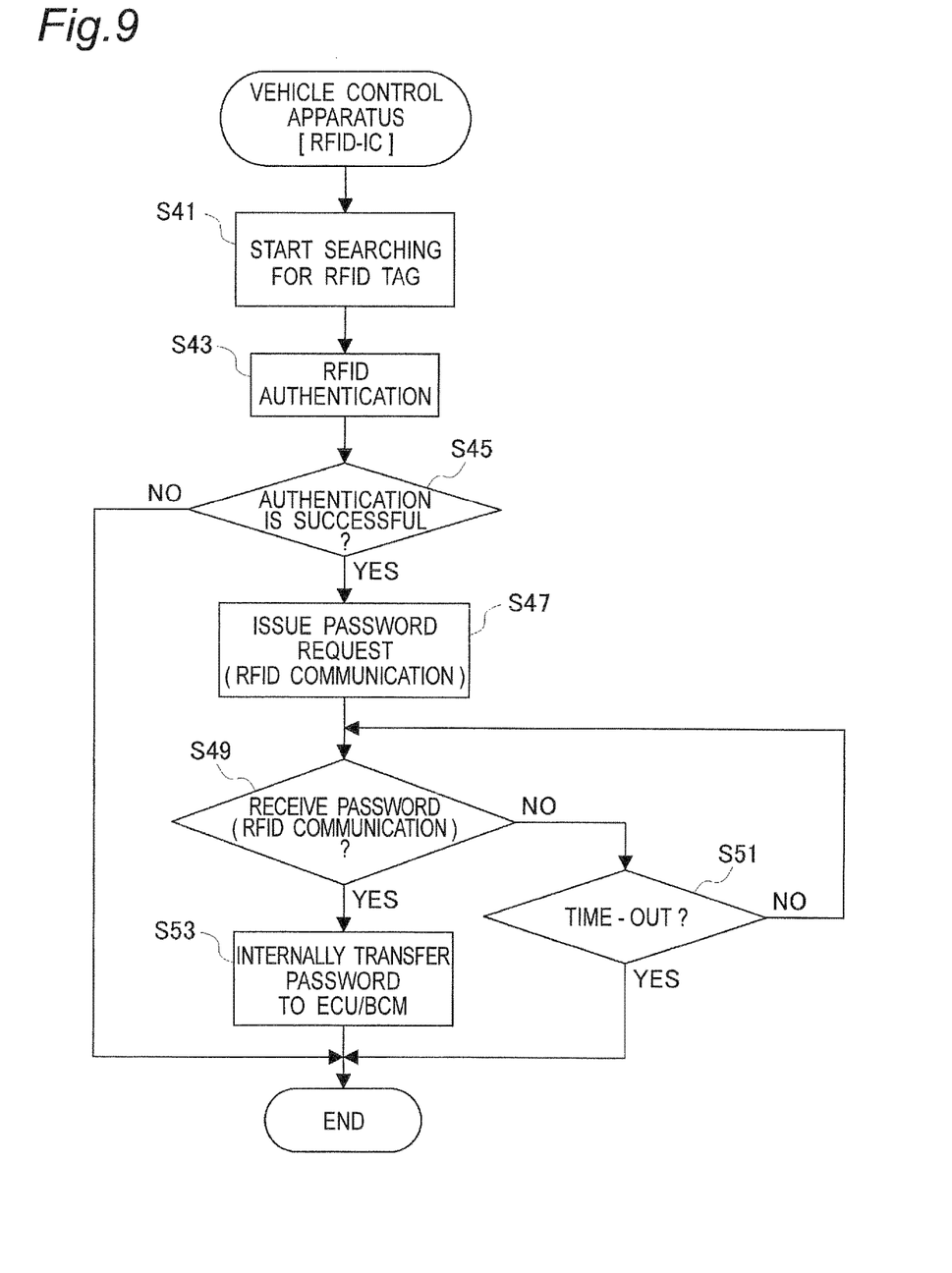
FIG. 9 is a flowchart of a portion of an operation of an RFID-IC disposed in the vehicle control apparatus.

Each of the RFID-ICs 42a to 42c disposed in the vehicle control apparatus 30 executes a process according to a flowchart shown in FIG. 9 in association with unlocking of the doors DR1 to DR3. This process is also repeatedly executed every several milliseconds, for example.

At step S41, searching for the RFID tag 16 is started. When the RFID tag 16 is found, the process goes to step S43 to execute an authentication, i.e., an RFID authentication, utilizing the unique ID of the RFID tag 16. It is determined at step S45 whether the RFID authentication is successful and, if the determination result is NO, the process is terminated, or if the determination result is YES, the process goes to step S47.

At step S47, a password request is issued in the RFID communication mode. It is determined at step S49 whether the password is received from the RFID tag 16 in the RFID communication mode, and it is determined at step S51 whether a time-out has occurred (a predetermined time has elapsed after the issuance of the password request).

If the determination result of step S49 is YES, the process goes to step S53, and the received password is internally transferred via the I2C interface 46 to the ECU/BCM 38. When the transfer is completed, the process is terminated. In contrast, if the determination result of step S51 is YES, the process is terminated without going through step S53.

As can be seen from the above description, the electronic key 10 is carried by a user and executes respective wireless communications following the keyless entry communication mode and the RFID communication mode. The wireless controller 32 is mounted on the vehicle VL and performs a wireless communication following the keyless entry communication mode in a range of several meters to several dozen meters in radius. The RFID readers 34a to 34c are mounted on the vehicle VL respectively correspondingly to the doors DR1 to DR3 and each perform a wireless communication following the RFID communication mode in a range of approximately 1 m in radius, for example. In association with unlocking of the doors DR1 to DR3, the wireless controller 32 disposed on the vehicle VL issues a password to the electronic key 10 in the keyless entry communication mode (S25 to S27), and the wireless circuit 14 disposed in the electronic key 10 temporarily stores the issued password (S5, S9). Each of the RFID readers 34a to 34c disposed on the vehicle VL searches for the password stored in the electronic key 10 in the RFID communication mode (S41 to S51). The wireless controller 38 exclusively unlocks the door corresponding to the RFID reader detecting the password, out of the doors DR1 to DR3 (S37).

Since a series of the processes described above is implemented by utilizing the keyless entry communication mode and the RFID communication mode, the circuit configuration is simplified. Since the door approached by the user is exclusively unlocked, the risk of a suspicious person getting into the vehicle VL from another door is prevented and the user's convenience is enhanced. Since a one-time password updated at each issuance is utilized, the security is maintained.

In this example, the password is issued in response to an operation of the unlock button 12 disposed on the electronic key 10. However, the wireless controller 32 disposed on the vehicle control apparatus 30 may repeatedly issue a response request to the electronic key 10 and, when the electronic key 10 returns a response signal thereto, i.e., when the electronic key 10 comes into the communication area of the wireless controller 32, the password may be issued from the vehicle control apparatus 30 to the electronic key 10.

In this example, the contents of the password are updated each time the password is issued once. However, the contents of the password may be updated each time the password is issued the predetermined number of times equal to or greater than two.

In this example, the door approached by the user is exclusively unlocked without exception. However, whether to exclusively unlock the door approached by the user or simultaneously unlock the doors DR1 to DR3 maybe switched depending on a user setting. In particular, for example, the electronic key may have two buttons, i.e., a button for unlocking only the door approached by the user and a button for the simultaneous unlocking, or the switching is able to be performed such that a system for unlocking only the door approached by the user is activated when the unlock button is pushed once, while a system for simultaneously unlocking all the doors is activated when the unlock button is pushed twice.

Although this example is described in terms of a three-door type vehicle having three doors in the left and right side portions and the rear portion (hatch) of the vehicle, the vehicle may be a five-door type vehicle. In the case of the five-door type, an RFID reader may be disposed for each of five doors, or a common RFID reader may be disposed for two doors (for front and rear seats) on the right side and a common RFID reader may be disposed for two doors (for front and rear seats) on the left side.

Correlation between the claims and features of preferred embodiments of the present invention will hereinafter be described. S25 to S27 of the flowchart correspond to a password generator or an issuing step recited in the claims. S5 and S9 of the flowchart correspond to a storage or a storing step recited in the claims. S41 to S51 of the flowchart correspond to a password detector or a searching step recited in the claims. S37 of the flowchart corresponds to an unlocking actuator or an unlocking step recited in the claims. S1 to S3 of the flowchart correspond to an indicator recited in the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A door unlocking system comprising:
   a portable device carried by a user and performing a wireless communication following a first short-range wireless communication mode and a wireless communication following a second short-range wireless communication mode;
   a first in-vehicle device mounted on a vehicle including a plurality of doors, the first in-vehicle device performing the wireless communication following the first short-range wireless communication mode in a first range; and
   a plurality of second in-vehicle devices mounted on the vehicle respectively correspondingly to the plurality of doors and each performing the wireless communication following the second short-range wireless communication mode in a second range smaller than the first range, the second range of each of the plurality of second in-vehicle devices corresponding to a respective door; wherein
   the first in-vehicle device includes a password generator issuing a password to the portable device in the first short-range wireless communication mode;
   the portable device includes a storage temporarily storing the password issued by the password generator;
   the plurality of second in-vehicle devices each includes a password detector searching for the password stored in the storage in the second short-range wireless communication mode; and
   the first in-vehicle device further includes an unlocking actuator unlocking a door corresponding to the second in-vehicle device including the password detector detecting the password stored in the storage.

2. The door unlocking system according to claim 1, wherein the password issued by the password generator has contents updated each time that a number of times of password issuance reaches a reference value.

3. The door unlocking system according to claim 1, wherein
   the portable device further includes an indicator notifying the first in-vehicle device of an unlocking operation by the user; and the password generator issues the password in response to a notification from the indicator.

4. The door unlocking system according to claim 1, wherein the portable device includes a passive wireless communication tag operative in accordance with the second short-range wireless communication mode.

5. The door unlocking system according to claim 1, wherein the plurality of second in-vehicle devices covers respective ranges independent of each other as the second range.

6. The door unlocking system according to claim 1, wherein the portable device is an electronic key.

7. The door unlocking system according to claim 6, wherein the electronic key includes an unlock button, a wireless circuit that performs wireless communication, and an RFID tag.

8. The door unlocking system according to claim 7, wherein the wireless circuit includes a control circuit and an antenna.

9. The door unlocking system according to claim 7, wherein the RFID tag includes an RFID-IC and an antenna.

10. The door unlocking system according to claim 1, wherein the vehicle is an automobile.

11. The door unlocking system according to claim 1, wherein the first in-vehicle device is a wireless controller.

12. The door unlocking system according to claim 1, wherein the second in-vehicle devices are RFID readers.

13. The door unlocking system according to claim 12, wherein each of the RFID readers includes an RFID-IC and an antenna.

14. The door unlocking system according to claim 1, wherein a range of the first short-range wireless communication mode is several meters to several dozen meters.

15. The door unlocking system according to claim 1, wherein a range of the second short-range wireless communication mode is approximately 1 meter.

16. A door unlocking method performed by a door unlocking system including a portable device carried by a user and performing a wireless communication following a first short-range wireless communication mode and a wireless communication following a second short-range wireless communication mode, a first in-vehicle device mounted on a vehicle including a plurality of doors, the first in-vehicle device performing the wireless communication following the first short-range wireless communication mode in a first range, and a plurality of second in-vehicle devices mounted on the vehicle respectively correspondingly to the plurality of doors and each performing the wireless communication following the second short-range wireless communication mode in a second range smaller than the first range, the second range of each of the plurality of second in-vehicle devices corresponding to a respective door, the method comprising:
    an issuing step in which the first in-vehicle device issues a password to the portable device in the first short-range wireless communication mode;
    a storing step in which the portable device temporarily stores the password issued in the issuing step;
    a searching step in which each of the plurality of second in-vehicle devices searches for the password stored in the storing step in the second short-range wireless communication mode; and
    an unlocking step in which the first in-vehicle device unlocks a door corresponding to the second in-vehicle device detecting the password stored in the storing step.

17. The door unlocking method according to claim 16, further comprising updating contents of the password issued in the issuing step each time that a number of times of password issuance reaches a reference value.

18. The door unlocking method according to claim 16, further comprising:
    notifying the first in-vehicle device of an unlocking operation by the user; and
    issuing the password in response to a notification from the indicator.

19. The door unlocking method according to claim 16, wherein the portable device includes a passive wireless communication tag operative in accordance with the second short-range wireless communication mode.

20. The door unlocking method according to claim 16, wherein the plurality of second in-vehicle devices covers respective ranges independent of each other as the second range.

* * * * *